United States Patent [19]
Swars

[11] Patent Number: 5,014,572
[45] Date of Patent: May 14, 1991

[54] ASSEMBLED CRANKSHAFT

[75] Inventor: Helmut Swars, Bergisch Gladbach, Fed. Rep. of Germany

[73] Assignee: Emitec Gesellschaft für Emissionstechnologie mbH, Lohmar, Fed. Rep. of Germany

[21] Appl. No.: 425,811

[22] Filed: Oct. 23, 1989

[30] Foreign Application Priority Data

Nov. 3, 1988 [DE] Fed. Rep. of Germany ....... 3837294

[51] Int. Cl.$^5$ ............................ F16C 3/04; B21K 1/08
[52] U.S. Cl. ...................................... 74/595; 74/598; 29/888.08
[58] Field of Search .................. 74/595–598, 74/603; 29/6, 447, 523.1, 156.4 R, 888.08

[56] References Cited

U.S. PATENT DOCUMENTS

| | | | |
|---|---|---|---|
| 1,541,758 | 6/1925 | Baker | 74/598 |
| 2,013,039 | 9/1935 | Dusevoir | 74/598 |
| 2,109,526 | 3/1938 | Fell | 74/597 |
| 2,309,047 | 1/1943 | Culbertson | 74/597 |
| 3,686,971 | 8/1972 | Strehler et al. | 29/6 |

FOREIGN PATENT DOCUMENTS

| | | |
|---|---|---|
| 3737600 | 5/1989 | Fed. Rep. of Germany . |
| 0103112 | 8/1980 | Japan ...................... 74/595 |
| 57-40924 | 8/1982 | Japan . |
| 57-55923 | 11/1982 | Japan . |

Primary Examiner—Allan D. Herrmann
Assistant Examiner—Winnie Yip
Attorney, Agent, or Firm—Toren, McGeady & Associates

[57] ABSTRACT

An assembled crankshaft whose crank webs on both sides are connected to, so as to be integral with, part of an adjoining shaft pin, with these parts being designed as hollow pins, and in the case of which crankshaft the parts of adjoining crank webs jointly forming a shaft pin are at least partially stepped in their diameter and inserted into each other, with the outer part having a higher yield point than the inner part and with a force-locking connection existing between the two parts.

12 Claims, 1 Drawing Sheet

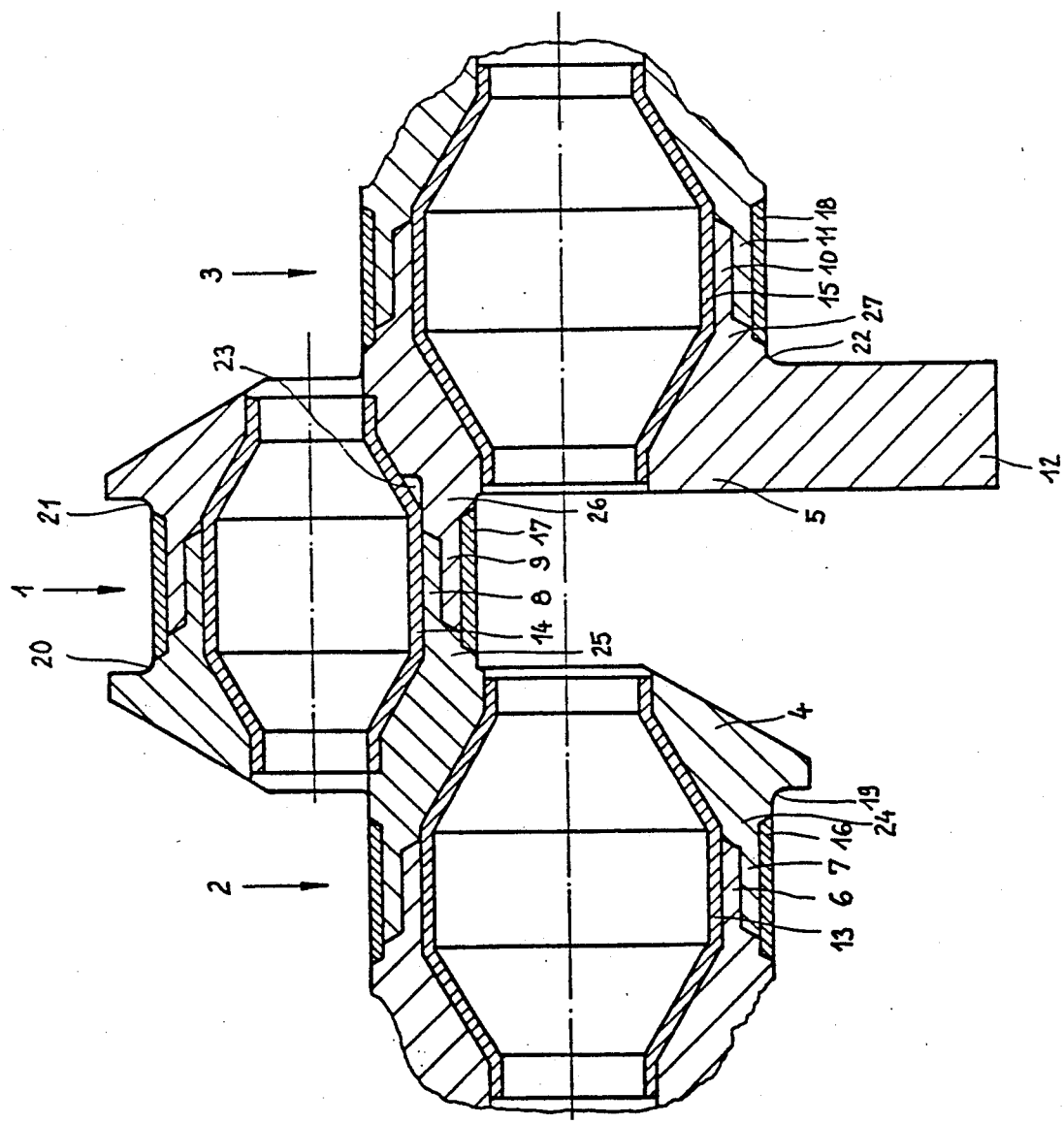

ASSEMBLED CRANKSHAFT

BACKGROUND OF THE INVENTION

The invention relates to an assembled crankshaft having crank webs on both sides which are connected to, so as to be integral with, parts of an adjoining pin, which are designed as hollow pins. Furthermore, it analogously relates to other shafts assembled from individual portions, with connecting regions of comparable geometry, for instance, to transmission shafts assembled from longitudinal portions or assembled camshafts.

Assembled camshafts of the above mentioned type are known in the art. In the case of these crankshafts, the webs are followed by hollow crank pin halves abutting with identical diameters, with an inserted sleeve connecting the pin halves to each other. Expansion of the inserted sleeve preferably takes place by applying hydraulic pressure or by using mechanical means. Furthermore, it is also possible to produce a shrink connection between the pin halves and the sleeve or to press the over-dimensioned sleeve into the pin halves. In addition to force locking connections, material locking connections produced by welding or soldering are also known.

SUMMARY OF THE INVENTION

It is an object of the present invention to improve an assembled shaft of the above type, especially a crankshaft, in such a way as to achieve a simple design and improved force locking between the pin parts connected to the webs. Pursuant to this object, and others which will become apparent hereafter, an aspect of the present invention resides in the parts of adjoining crank webs jointly forming a shaft pin being at least partially stepped in their diameter and inserted into each other. Between the two parts there exists a torsion-resistant, i.e. a force locking or material locking connection. The above described design of the pin parts, to start with, permits a simplification in design because, if necessary, it is possible to do without additional parts, especially a separate inserted sleeve. With a predetermined outer pin diameter, it is possible to increase the cylindrical face of the connection. In contrast to prior art connections where in the region of abutment of the joint halves, only the connecting sleeve is torsion loaded, the present design avoids irregularities of this type by providing conical faces.

By having different material properties of the parts to be inserted into each other, with for instance the outer part having a higher yield point than the inner part, it is possible to produce a force locking connection by carrying out an operation of internal expansion directly between parts connected to, so as to be integral with, the respective adjoining crank webs.

In addition to the above advantages, a further embodiment provides for a connecting sleeve to be fittingly inserted into the two parts inserted into each other. In this way, the connection is given a three-layer design, thereby creating a second cylindrical face in which a force locking connection is produced. A precondition for producing a connection by internal expansion is the outwardly increasing yield point of the three layers, with the yield point of the connecting sleeve being lower than that of the inner part. At least one sleeve is deformed beyond its limit of elasticity and the outer part is deformed purely elastically. To achieve the necessary prestress between the layer it is of no importance whether the central layer, together with the inner layer, is also deformed beyond its limit of elasticity or whether, like the outer layer, it is deformed purely elastically. By distributing the wall thicknesses accordingly, it is possible to achieve the stress condition most suitable for the connection.

In another embodiment, a bearing sleeve is fittingly slid onto the two parts inserted into each other, with the yield point of the bearing sleeve being higher than that of the outer part and with at least the inner part being deformed beyond its limit of elasticity and the bearing sleeve being deformed purely elastically. This embodiment, too, permits the connecting region to consist of three layers, and analogously, the same applies as explained previously, with the special advantage of the bearing sleeve consisting of ball bearing steel or the like with particularly advantageous bearing properties, independently of the material of the crank webs. A smaller wall thickness overall may be achieved by selecting a maximum yield point of the outermost sleeve. However, this embodiment may also be used in connection with the inserted connecting sleeve, as a result of which a four layer structure is achieved, with the force locking connection being distributed to three cylindrical faces inserted into each other.

As in the preferred application, in the case of crankshafts, the connecting regions are subjected to torsional forces and continuous bending loads. It is thus necessary to achieve a secure connection, with the large connecting regions being advantageous and with further improvements being achieved by accurate machining and careful adaptation of the surface which, in order to bring about a material locking connection, may be machined to be metallically bright or subjected to a pulsating pressure load during expansion.

Especially by using separate bearing sleeves, it is possible to select a material for the webs and the adjoining pins which is most suitable from the point of view of cost, weight or strength, with the latter being forged, cast or sintered.

Particular attention has been paid to the design of the transitions from the pin parts to the crank webs, which should be carefully curved and provided with large radii. By using additional connecting sleeves, it is possible, in an advantageous way, to produce annular lubricating spaces in the crankshaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

A preferred embodiment of the invention is illustrated in the drawing showing a portion of a crankshaft with two main pins and one crank pin, each pin consisting of parts inserted into each other and connected to the adjoining webs.

DETAILED DESCRIPTION OF THE PREFERRED EMBODIMENTS

As far as details are concerned, the crankshaft in accordance with the invention shows the crank pin 1 and the main or bearing pins 2, 3 between which crank webs 4 and 5 form the transitions. The crank web 5 differs from the crank web 4 by being provided with a counterweight 12 formed on so as to be integral with the web 5. On the left, the crank web 4 is followed by an outer sleeve 7 of the main pin 2 and on the right by an inner sleeve 8 of the crank pin 1. The crank web 5 is followed, on the left, by an outer sleeve 9 of the crank pin 1 and, on the right, by an inner sleeve 10 of the main pin 3. Into the previously mentioned sleeve 7 there has been inserted a further sleeve 6 of a further, only partially illustrated crank web, and into the inner sleeve 10 of the main pin 3 there has been inserted a further sleeve 11 of a further crank web, also not illustrated.

Of the above mentioned pin parts (sleeve projections) 6, 7; 8, 9; 10, 11, the first inner part always has a lower yield point than the second outer part, with a force locking connection existing between the two. Into the pin parts inserted into each other, there has been slid an inner sleeve 13, 14, 15 which, for reasons of improved sealing and higher strength, is provided with a reduced diameter towards both ends in the region of the crank webs and which also may be designed to be eccentric relative to the central portion. However, fully cylindrical sleeves are equally suitable. The sleeves 13, 14, 15 are each made of a material which has a lower yield point than that of the respective inner pin parts 6, 8, 10. Furthermore, bearing sleeves 16, 17, 18, having a higher yield point than a respective outer pin part 7, 9, 11, are slid onto the pin parts 6, 8; 8, 9; 10, 11. They may consist of, for example, a ball bearing steel or a material with a maximum yield point, whereas the inner sleeves do not have to have any special strength properties with the exception of being slightly plasticisable. To avoid any abrupt changes in strength, the ends of the pin parts have been given a conical design and furthermore, the transitions from the pin parts provided with reinforced base portions 24, 25, 26, 27 to the crank webs are provided with curvatures 19, 20, 21, 22. Because the crank shape differs from the sleeve shape, a lubricating oil space 23 is provided between the sleeve 14, and the crank 5.

The fact that the subject of the invention may also be applied to transmission shafts becomes clear when looking at the possible crank web modifications incorporating a counterweight relative to a gear, with the pins or shaft projections at both ends adjoining each other coaxially.

While the invention has been illustrated and described as embodied in an assembled crankshaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. An assembled crankshaft, comprising crank webs which on both sides are integrally connected to part of adjoining hollow pins so that two parts (8, 9; 6, 7; 11) of adjoining crank webs (4, 5) jointly form a shaft pin (1; 2; 3), the parts forming the shaft pin having at least partially stepped diameter and being insertable into each other so as to define an inner part and an outer part, a torsion-resistant, force-locking connecting being provided between the parts, only the two parts (6, 7; 8, 9; 10, 11) which are inserted into each other forming part of the connection, the inner part (6, 8, 10) being deformed beyond its limit elasticity and the outer part (7, 9, 11) being deformed purely elastically, the outer part (9, 7, 11) having a higher yield point than the inner part (8, 6, 10).

2. A crankshaft according to claim 1, and further comprising a connecting sleeve (13; 14; 15) fittingly inserted into the two parts (6, 7; 8, 9; 10, 11) inserted into each other, the connecting sleeve having a yield point lower than that of the inner part (6; 8; 10), and at least the connecting sleeve (13; 14; 15) being deformed beyond its limit of elasticity and the outer part (7; 9; 11) being deformed purely elastically.

3. A crankshaft according to claim 1, and further comprising a bearing sleeve (16; 17; 18) fittingly slid onto the two parts (6, 7; 8, 9; 10, 11) inserted into each other, the bearing sleeve having a yield point higher than that of the outer part (7; 9; 11), and at least the inner part (6, 8, 10) being deformed beyond its limit of elasticity and the bearing sleeve (16; 17; 18)being deformed purely elastically.

4. A crankshaft according to claim 1, wherein the respective inner, part (6; 8; 10) at a crank web is a soft-annealed part prior to becoming part of the force-locking connection.

5. A crankshaft according to claim 1, wherein the respective outer part (7; 9; 11) at a crank web is a quenched and tempered part prior to becoming part of the force-locking connection.

6. A crankshaft according to claim 1, wherein the parts (8, 9; 6, 7; 10, 11) inserted into each other are cylindrical sleeves with stepped diameters.

7. A crankshaft according to claim 1, wherein the parts (8, 9; 6, 7; 10, 11) inserted into each other engage each other with conical faces.

8. A crankshaft according to claim 1, wherein the inserted parts (8, 9; 6, 7; 10, 11) of the pins (1; 2; 3), in the direction of the crank webs (4, 5), are followed by base regions (24, 25, 26, 27) having a wall thickness equal to that of the parts connected to each other as a whole.

9. A crankshaft according to claim 8, wherein the base regions (24, 25, 26, 27) are arranged so that at at least one of their insides and outsides the base regions (24, 25, 26, 27) pass into the crank webs (4, 5) with curvatures (19, 20, 21, 22).

10. A crankshaft according to claim 2, wherein the connecting sleeve (13, 14, 15) is made of a steel with one of a lower yield point, non-ferrous metal and a light metal.

11. A crankshaft according to claim 2, wherein the connecting sleeve (13, 14, 15) includes several cylindrical portions which are eccentrically offset relative to each other and have an outwardly stepped diameter.

12. A crankshaft according to claim 3, wherein the bearing sleeve (16, 17, 18) is made of a ball bearing steel with a highest possible yield point.

* * * * *